US012662408B2

(12) United States Patent
Liang

(10) Patent No.: US 12,662,408 B2
(45) Date of Patent: Jun. 23, 2026

(54) LENS FORMING METHOD

(71) Applicant: AAC OPTICS (CHANGZHOU) CO., LTD., Changzhou City (CN)

(72) Inventor: Tao Liang, Changzhou (CN)

(73) Assignee: AAG OPTICS (CHANGZHOU) CO., LTD., Changzhou City (CN)

( * ) Notice: Subject to any disclaimer, the term of this patent is extended or adjusted under 35 U.S.C. 154(b) by 214 days.

(21) Appl. No.: 18/324,188

(22) Filed: May 26, 2023

(65) Prior Publication Data

US 2024/0246849 A1      Jul. 25, 2024

Related U.S. Application Data

(63) Continuation of application No. PCT/CN2023/085276, filed on Mar. 30, 2023.

(30) Foreign Application Priority Data

Jan. 19, 2023      (CN) .......................... 202310090073.3

(51) Int. Cl.
  *C03B 11/08*      (2006.01)
  *C03B 11/00*      (2006.01)
  (Continued)

(52) U.S. Cl.
  CPC ............ *C03B 11/08* (2013.01); *C03B 11/005* (2013.01); *C03B 11/122* (2013.01);
  (Continued)

(58) Field of Classification Search
  CPC ..... C03B 11/05; C03B 2215/80; C03B 11/08; C03B 2215/414
  See application file for complete search history.

(56) References Cited

U.S. PATENT DOCUMENTS 5,120,343 A  *  6/1992  Monji ..................... C03B 11/08
                                                    425/408
5,173,100 A  *  12/1992  Shigyo ................... C03B 11/08
                                                    65/102

(Continued)

FOREIGN PATENT DOCUMENTS

CN        103058501 A  *  4/2013
CN        110304816 A  *  10/2019
          (Continued)

OTHER PUBLICATIONS

<https://glassproperties.com/viscosity/Glass-Viscosity-Fixpoints. htm> archived by Wayback Machine on Dec. 18, 2007 (Year: 2007).*

*Primary Examiner* — Erin Snelting
*Assistant Examiner* — Steven S Lee
(74) *Attorney, Agent, or Firm* — Wiersch Law Group

(57)        ABSTRACT

A lens forming method is provided, including: heating a blank mold with a pre-molding cavity until a glass preform in the pre-molding cavity is in a semi-molten state; applying a pressure to the blank mold, so that the glass preform is extruded to form a lens rough blank with a predetermined shape; cooling the blank mold and the lens rough blank, and separating the blank mold by depressurization, to transfer the lens rough blank to a molding cavity of a high-precision aspherical mold; heating the high-precision aspherical mold until the lens rough blank is softened to a semi-molten state; applying a pressure to the high-precision aspherical mold, so that the lens rough blank is extruded to form a lens molded part with an aspherical structure; and cooling the high-precision aspherical mold and the lens molded part, and separating the high-precision aspherical mold by depressurization, to remove the lens molded part.

8 Claims, 2 Drawing Sheets

(51) Int. Cl.
    *C03B 11/12*       (2006.01)
    *C03B 21/02*       (2006.01)

(52) U.S. Cl.
    CPC ............ *C03B 11/125* (2013.01); *C03B 21/02*
        (2013.01); *C03B 2215/49* (2013.01)

(56)             References Cited

U.S. PATENT DOCUMENTS

| | | | | |
|---|---|---|---|---|
| 2010/0055395 A1 * | 3/2010 | Ukrainczyk | ............ | C03C 3/085 |
| | | | | 65/106 |
| 2011/0075264 A1 * | 3/2011 | Chen | ................ | B29D 11/00009 |
| | | | | 359/619 |
| 2012/0068370 A1 * | 3/2012 | Saruya | .................... | B29C 43/18 |
| | | | | 264/1.36 |
| 2017/0029311 A1 * | 2/2017 | Brockmeier | ............ | C03B 11/08 |
| 2021/0230041 A1 * | 7/2021 | Gindele | ................ | C03B 23/203 |

FOREIGN PATENT DOCUMENTS

| | | | | | | |
|---|---|---|---|---|---|---|
| EP | 0078658 | A2 | * | 5/1983 | ............ | C03B 11/00 |
| JP | H02235729 | A | * | 9/1990 | ............ | B29D 11/00 |
| JP | H0729782 | B2 | * | 4/1995 | ............ | C03B 11/00 |
| JP | 2002293553 | A | * | 10/2002 | .......... | C03B 11/082 |
| JP | 2006315877 | A | * | 11/2006 | ............ | C03B 11/08 |
| JP | 2007031265 | A | * | 2/2007 | | |
| JP | 2007076945 | A | * | 3/2007 | | |
| JP | 2007284335 | A | * | 11/2007 | ............ | C03C 3/068 |
| JP | 2012046370 | A | * | 3/2012 | | |
| KR | 20180036453 | A | * | 4/2018 | ....... | B29D 11/00538 |
| WO | WO-2013118888 | A1 | * | 8/2013 | ............ | C03B 11/02 |

* cited by examiner

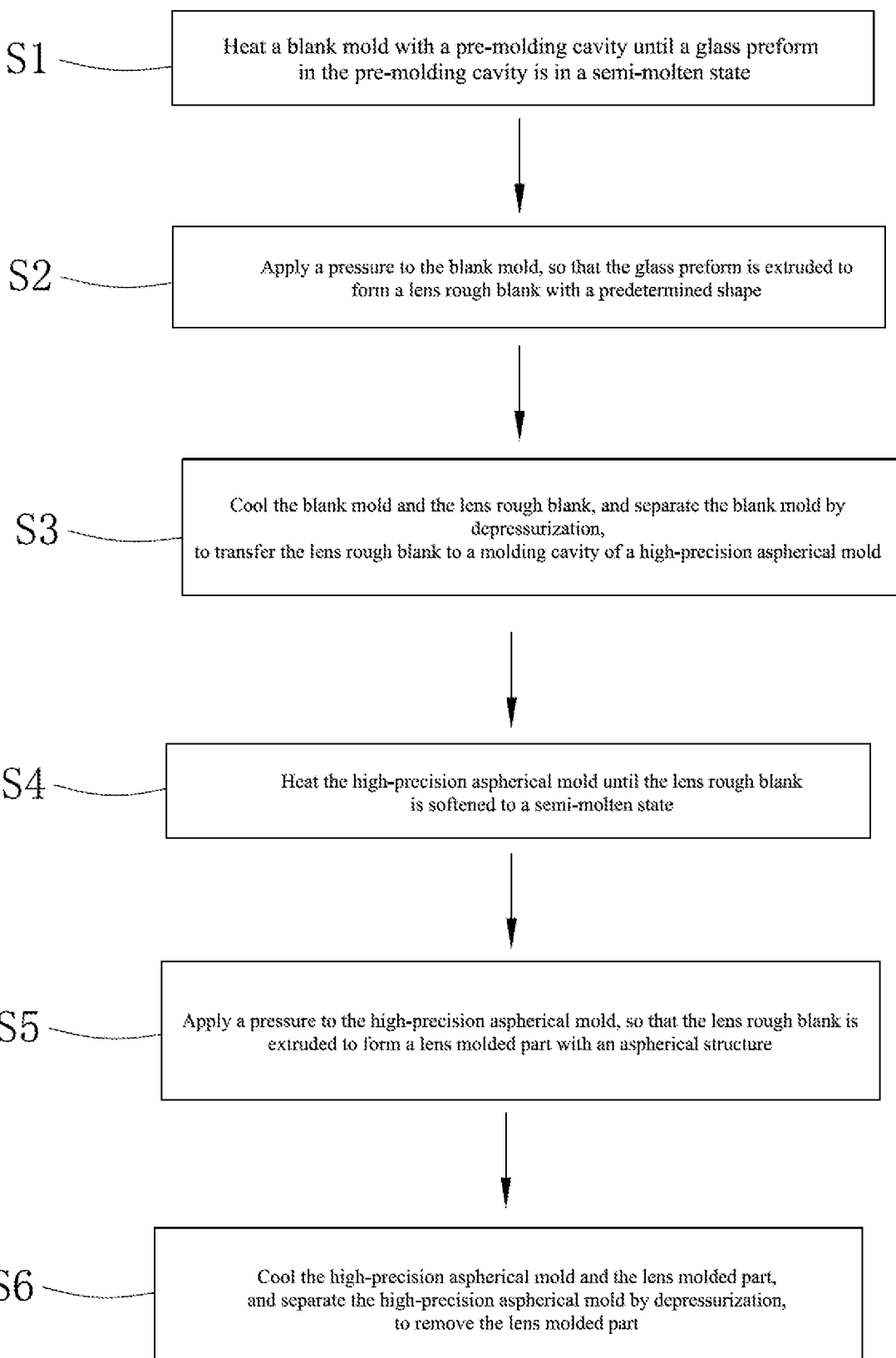

S1 — Heat a blank mold with a pre-molding cavity until a glass preform in the pre-molding cavity is in a semi-molten state S2 — Apply a pressure to the blank mold, so that the glass preform is extruded to form a lens rough blank with a predetermined shape S3 — Cool the blank mold and the lens rough blank, and separate the blank mold by depressurization, to transfer the lens rough blank to a molding cavity of a high-precision aspherical mold S4 — Heat the high-precision aspherical mold until the lens rough blank is softened to a semi-molten state S5 — Apply a pressure to the high-precision aspherical mold, so that the lens rough blank is extruded to form a lens molded part with an aspherical structure S6 — Cool the high-precision aspherical mold and the lens molded part, and separate the high-precision aspherical mold by depressurization, to remove the lens molded part

FIG. 1

LENS FORMING METHOD

TECHNICAL FIELD

The present disclosure relates to the field of optical technologies, and in particular to a lens forming method.

BACKGROUND

Lenses are an optical element made of transparent materials like glass, plastic, etc., which have been widely used in various fields, such as security, vehicle, digital camera, laser, optical instrument, etc. With the unceasing development of the market, the application of lenses becomes widespread. In particular, as the Internet technologies advance, more electronic devices, such as mobile phones, tablets, laptops, etc., are integrated into people's lives, thereby putting forward higher requirements for lenses.

In the related art, a lens molding method includes the steps of heating a high-precision aspherical mold to a glass softening point temperature, so that the glass on the surface of the mold is softened to a semi-molten state (the semi-molten glass has plasticity and is in a semi-flow state); vacuuming the molding cavity to a vacuum state; and applying a pressure to the high-precision aspherical mold to mold the glass wafer, so as to obtain an aspherical lens. However, this lens forming method has the following disadvantages:

1. When molding a lens with a complex structure, especially a lens with a large sagittal height, a biconvex structure, or an inflection structure, multiple molding processes are needed, resulting in long molding time and low efficiency.

2. For a mold with multiple cavities, due to influences of glass flow and cavity pressure, the edge cavities have a poor molding yield, thereby reducing the overall appearance yield.

3. The high-precision aspheric mold needs to be made of a high temperature resistant material, for example, the mold with a multi-cavity structure is made of tungsten steel. This mold is difficult to process, so that the processing cost is high and the processing cycle is long, which results in high mold sharing cost for a single lens, and also affects the processing progress. As a result, it is inconducive to large-scale mass production, as well as inconducive to cost reduction and efficiency improvement.

Therefore, it is necessary to improve the current lenses forming method, to avoid the foregoing disadvantages.

SUMMARY

The present disclosure aims to provide a lens forming method, which not only improves the appearance yield of the multi-cavity mold by 10-15%, but also improves the utilization rate of the device and the molds. The production capacity of a single set of high-precision aspherical mold is increased by two times, that is, the production efficiency of lens is increased by two times. Therefore, under the same production capacity, the manufacturing of the high-precision aspherical molds can be cut in half, thereby reducing the cost by more than ⅓.

In order to achieve the above objectives, the present disclosure provides a lens forming method, including:

heating a blank mold with a pre-molding cavity until a glass preform in the pre-molding cavity is in a semi-molten state;

applying a pressure to the blank mold, so that the glass preform is extruded to form a lens rough blank with a predetermined shape;

cooling the blank mold and the lens rough blank, and separating the blank mold by depressurization, to transfer the lens rough blank to a molding cavity of a high-precision aspherical mold;

heating the high-precision aspherical mold until the lens rough blank is softened to a semi-molten state;

applying a pressure to the high-precision aspherical mold, so that the lens rough blank is extruded to form a lens molded part with an aspherical structure; and cooling the high-precision aspherical mold and the lens molded part, and separating the high-precision aspherical mold by depressurization, to remove the lens molded part.

In some embodiments, the blank mold includes a first fixed mold with a first molding surface; and a first moving mold with a second molding surface. The first molding surface and the second molding surface are opposite and spaced apart, to form the pre-molding cavity; at least one first cavity is defined in the first molding surface; at least one second cavity is defined in the second molding surface; and a space between the first cavity and the second cavity forms a pre-molding space of the lens rough blank.

In some embodiments, the pressure applied to the blank mold acts on the first moving mold; and during a process in which the pressure is applied to the blank mold so that the glass preform is extruded to form the lens rough blank with a predetermined shape, a magnitude of a surface force is changed by controlling a distance between parting surfaces of the first moving mold and the first fixed mold, to control a shape of the lens rough blank.

In some embodiments, the high-precision aspherical mold includes a second fixed mold with a third molding surface; and a second moving mold with a fourth molding surface. The third molding surface and the fourth molding surface are opposite and spaced apart, to form the molding cavity; at least one third cavity is defined in the third molding surface; at least one fourth cavity is defined in the fourth molding surface; and a space between the third cavity and the fourth cavity forms a molding space of the lens molded part.

In some embodiments, the pressure applied to the high-precision aspherical mold acts on the second moving mold; and during a process in which the pressure is applied to the high-precision aspherical mold so that the lens rough blank is extruded to form the lens molded part with an aspherical structure, a magnitude of a surface force is changed by controlling a distance between parting surfaces of the second moving mold and the second fixed mold, to control a shape of the lens molded part.

In some embodiments, the blank mold is subjected to heating and cooling separately in a first molding chamber of a molding machine, and during heating and cooling processes, the first molding chamber is filled with nitrogen gas; or/and, the high-precision aspherical mold is subjected to heating and cooling separately in a second molding chamber of the molding machine, and during the heating and cooling processes, the second molding chamber is filled with nitrogen gas.

In some embodiments, vacuuming the pre-molding cavity, before applying the pressure to the blank mold; or/and, vacuuming the molding cavity, before applying the pressure to the high-precision aspherical mold.

In some embodiments, when the blank mold is heated until the glass preform in the blank mold is in the semi-molten state, a temperature of the blank mold is a first preset temperature, where the first preset temperature is equal to a glass sag temperature plus T1, and 20° C.≤T1≤40° C.; or/and, when the high-precision aspherical mold is heated until the lens rough blank is softened to the semi-molten state, a temperature of the high-precision aspherical mold is a second preset temperature, where the second preset temperature is equal to the glass sag temperature plus T2, and 20° C.≤T2≤50° C.; or/and, after cooling the blank mold and the lens rough blank, a temperature of the blank mold is a third preset temperature, where the third preset temperature is equal to a glass transition temperature minus T3, and 20° C.≤T3≤50° C.

In some embodiments, the lens molded part includes a plurality of lenses arranged in an array, and the plurality of lenses arranged in an array are cut by a laser to obtain individual lenses.

In some embodiments, the glass preform is a molten glass droplet or a glass substrate.

Compared with related art, according to the lens forming method provided by the present disclosure, the glass preform is first pre-molded to form the lens rough blank with a predetermined shape by the blank mold, and then the lens rough blank is molded to form the lens molded part with an aspherical structure by the high-precision aspherical mold. The present lens forming method not only improves the appearance yield of the multi-cavity mold by 10-15%, but also improves the utilization rate of the device and the molds. The production capacity of a single set of high-precision aspherical mold is increased by two times, that is, the production efficiency of lens is increased by two times. Therefore, under the same production capacity, the manufacturing of the high-precision aspherical molds can be cut in half, thereby reducing the cost by more than ⅓.

BRIEF DESCRIPTION OF THE DRAWINGS

In order to explain the technical solution in the embodiments of the present disclosure more clearly, a brief introduction is given to the accompanying drawings required in the embodiments. It is obvious that the accompanying drawings in the following description are only some embodiments of the present disclosure. For those skilled in the art, other accompanying drawings can be obtained based on these drawings without any creative working.

FIG. 1 is a schematic flowchart of a lens forming method according to an embodiment of the present disclosure.

DETAILED DESCRIPTION OF THE EMBODIMENTS

The following will provide a clear and complete description of the technical solution in the embodiments of the present disclosure in conjunction with the accompanying drawings. Obviously, the described embodiments are only a part of the embodiments of the present disclosure, not all of them. Based on the embodiments in the present disclosure, all other embodiments obtained by those skilled in the art without creative working fall within the scope of protection of the present disclosure.

Figure 2:
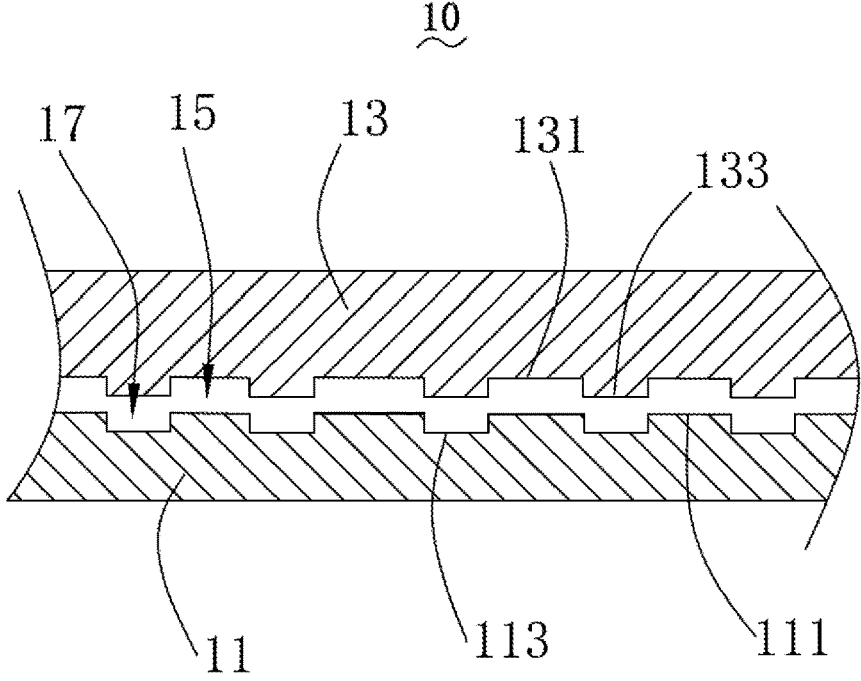
FIG. 2 is a partial structural diagram of a blank mold according to an embodiment of the present disclosure.
Figure 3:
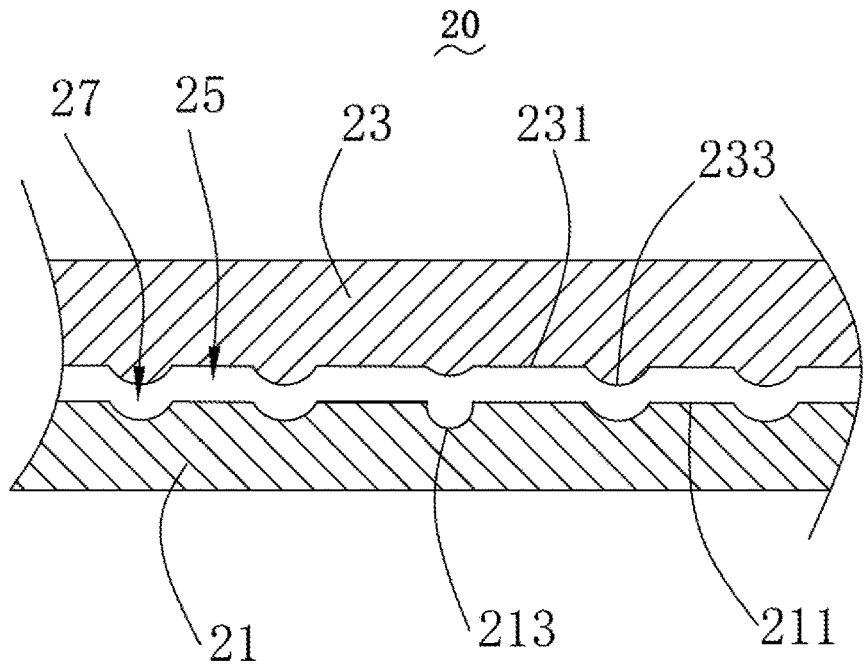
FIG. 3 is a partial structural diagram of a high-precision aspherical mold according to an embodiment of the present disclosure.

Referring to FIG. 1 to FIG. 3, the present disclosure provides a lens forming method, including the following steps:

Step S1. Heat a blank mold with a pre-molding cavity until a glass preform in the pre-molding cavity is in a semi-molten state.

As shown in FIG. 2, a blank mold 10 includes a first fixed mold 11 with a first molding surface 111 and a first moving mold 13 with a second molding surface 131. The first molding surface 111 and the second molding surface 131 are opposite and spaced apart, to form a pre-molding cavity 15. At least one first cavity 113 is defined in the first molding surface 111, and at least one second cavity 133 is defined in the second molding surface 131. The space between the first cavity 113 and the second cavity 133 forms a pre-molding space 17 for molding a lens rough blank. The pre-molding space 17 is a part of the pre-molding cavity 15.

In this embodiment, the blank mold 10 has a plurality of pre-molding spaces 17 arranged in an array. That is to say, the lens rough blank molded by the blank mold 10 includes rough lens arranged in an array.

In optional embodiments, the glass preform is a molten glass droplet or a glass substrate. Specifically, when the glass preform is a molten glass droplet, it is directly poured into the pre-molding cavity 15, and remains in the semi-molten state by the heated blank mold 10. When the glass preform is a glass substrate, after the glass preform is placed on the first fixed mold 11, an execution mechanism of a molding machine controls the first moving mold 13 of the blank mold 10 to close the mold with the fixed mold 11, so that the glass preform is accommodated in the pre-molding cavity, and is softened to the semi-molten state by the heated blank mold 10. The glass preform in the semi-molten state can fully fill the pre-molding cavity 15.

In this embodiment, the blank mold is heated in a first molding chamber of the molding machine. During the heating process, the first molding chamber is filled with nitrogen gas, which makes the temperature of the blank mold rise faster, thereby reducing the heating time under the same heating power.

It should be noted that a heating apparatus corresponding to the first fixed mold 11 and the first moving mold 13 is disposed in the first molding chamber of the molding machine. The heating apparatus is configured to heat the first fixed mold 11 and the first moving mold 13. In some embodiments, the heating apparatus is a heating rod or a heating resistance wire.

In this embodiment, when the blank mold is heated until the glass preform inside the blank mold is in the semi-molten state, the temperature of the blank mold is a first preset temperature. The first preset temperature is equal to a glass sag temperature plug T1, where 20° C.≤T1≤40° C.

It should be noted that the glass sag temperature is the temperature at which a glass preform specimen stops expansion during the heating process.

In this embodiment, the first fixed mold 11 and the first moving mold 13 of the blank mold 10 are made of a material such as tungsten steel or stainless steel.

Step S2. Apply a pressure to the blank mold, so that the glass preform is extruded to form a lens rough blank with a predetermined shape. Specifically, the pressure applied to the blank mold 10 acts on the first moving mold 13. In addition, during the process in which the pressure is applied to the blank mold so that the glass preform is extruded to form the lens rough blank with a predetermined shape, according to the Lennard-Jones potential law, a magnitude of a surface force is changed by controlling a distance between parting surfaces of the first moving mold 13 and the first fixed mold 11, to control a shape of the lens rough blank.

In this embodiment, the pressure applied to the blank mold is a first preset pressure, which is 80 KN to 160 KN.

In this embodiment, the pre-molding cavity is vacuumed before the pressure is applied to the blank mold.

In this embodiment, a vacuum degree of the pre-molding cavity 15 after being vacuumed is 0 mbar to 0.5 mbar.

Step S3. Cool the blank mold and the lens rough blank, and separate the blank mold by depressurization, to transfer the lens rough blank to a molding cavity of a high-precision aspherical mold.

In this embodiment, the blank mold 10 is cooled in the first molding chamber of the molding machine. During the cooling process, the first molding chamber is filled with nitrogen gas, which makes the temperature of the blank mold drop faster.

In this embodiment, the blank mold 10 is rapidly cooled by circulating cooling water. After the blank mold and lens rough blank are cooled, the temperature of the blank mold is a third preset temperature. The third preset temperature is equal to a glass transition temperature minus T3, where $20°$ $C.\leq T3\leq 50°$ C. That is to say, the lens rough blank needs to be cooled below the glass transition temperature, so as to make the shape of the lens rough blank fixed, thereby facilitating the transfer of the lens rough blank.

It should be noted that the glass transition temperature is the temperature corresponding to the transition of the lens rough blank from a glassy state to a high elastic state.

As shown in FIG. 3, the high-precision aspheric mold 20 includes a second fixed mold 21 with a third molding surface 211 and a second moving mold 23 with a fourth molding surface 231. The third molding surface 211 and the fourth molding surface 231 are opposite and spaced apart, to form a molding cavity 25. At least one third cavity 213 is defined in the third molding surface 211, and at least one fourth cavity 233 is defined in the fourth molding surface 231. The space between the third cavity 213 and the fourth cavity 233 forms a molding space 27 of the lens molded part. The molding space 27 is a part of the molding cavity 25.

The third cavity 213 may be a protrusion or a groove, and the fourth cavity 233 may be a protrusion or a groove.

In this embodiment, the shapes of the third cavity 213 and the fourth cavity 233 are set according to the specific structure of the lens, such as a diameter of the lens, a thickness of the lens, a curved surface shape of an incident plane, and a curved surface shape of an outgoing plane.

In this embodiment, the second fixed mold 21 and the second moving mold 23 of the high-precision aspherical mold 20 are made of tungsten steel or stainless steel, by means of metal cutting or other manners. In addition, the molded mold needs to undergo subsequent processes such as coating, to ensure its service life and the accuracy of the molded product.

Step S4. Heat the high-precision aspherical mold until the lens rough blank is softened to a semi-molten state.

In this embodiment, the high-precision aspherical mold is heated in a second molding chamber of the molding machine. During the heating process, the second molding chamber is filled with nitrogen gas, which makes the temperature of the high-precision aspherical mold rise faster, thereby reducing the heating time under the same heating power.

It should be noted that a heating apparatus corresponding to the second fixed mold 21 and the second moving mold 23 is disposed in the second molding chamber of the molding machine. The heating apparatus is configured to heat the second fixed mold 21 and the second moving mold 23.

In this embodiment, when the high-precision aspherical mold is heated until the lens rough blank is softened to the semi-molten state, the temperature of the high-precision aspherical mold is a second preset temperature. The second preset temperature is equal to the glass sag temperature plus T2, where $20°$ $C.\leq T2\leq 50°$ C.

Step S5. Apply a pressure to the high-precision aspherical mold, so that the lens rough blank is extruded to form a lens molded part with an aspherical structure. Specifically, the pressure applied to the high-precision aspheric mold acts on the second moving mold 23. In addition, during the process in which the pressure is applied to the high-precision aspheric mold so that the lens rough blank is extruded to form the lens molded part with an aspheric structure, according to the Lennard-Jones potential law, a magnitude of a surface force is changed by controlling a distance between parting surfaces of the second moving mold and the second fixed mold, to control a shape of the lens molded part.

In this embodiment, the pressure applied to the high-precision aspherical mold is a second preset pressure, which is 100 KN to 160 KN.

In this embodiment, the molding cavity is vacuumed before the pressure is applied to the high-precision aspherical mold.

In this embodiment, a vacuum degree of the molding cavity after being vacuumed is 0 mbar to 0.2 mbar.

Step S6. Cool the high-precision aspherical mold and the lens molded part, and separate the high-precision aspherical mold by depressurization, to remove the lens molded part.

In this embodiment, the high-precision aspherical mold 20 has a plurality of molding spaces 27 arranged in an array. That is to say, the lens molded part molded by the high-precision aspheric mold 20 includes a plurality of lenses arranged in an array. The plurality of lenses arranged in an array are cut by a laser, to obtain individual lens.

It should be noted that during the cooling processes of the blank mold and the high-precision aspherical mold, the pressures are maintained on the molds. After the applied pressures are reduced, the blank mold 10 and the high-precision aspherical mold 20 are controlled by an actuator, to realize actions such as mold opening and mold closing.

On one hand, as shown in FIG. 2, the first cavity 113 and the second cavity 131 have a rectangular shape; and as shown in FIG. 3, the third cavity 213 and the fourth cavity 233 have a curved surface shape set according to the specific structure of the lens. The first cavity 113 and the second cavity 131 in the rectangular shape are easier to process than the third cavity 213 and the fourth cavity 233 in the curved surface shape. On the other hand, according to the lens forming method provided by the present disclosure, the glass preform is first pre-molded to form the lens rough blank with a predetermined shape by the blank mold, and then the lens rough blank is molded to form the lens molded part with an aspherical structure by the high-precision aspherical mold. Therefore, the first cavity 113 and the second cavity 131 do not have high requirements for processing accuracy. The blank mold is easier to process than the high-precision aspherical mold, thereby effectively reducing the cost of the molds.

Compared with related art, according to the lens forming method provided by the present disclosure, the glass preform is first pre-molded to form the lens rough blank with a predetermined shape by the blank mold, and then the lens rough blank is molded to form the lens molded part with an aspherical structure by the high-precision aspherical mold.

The present lens forming method not only improves the appearance yield of the multi-cavity mold by 10-15%, but also improves the utilization rate of the device and the molds. The production capacity of a single set of high-precision aspherical mold is increased by two times, that is, the production efficiency of lens is increased by two times. Therefore, under the same production capacity, the manufacturing of the high-precision aspherical molds can be cut in half, thereby reducing the cost by more than ⅓.

The above mentioned are merely some embodiments of the present disclosure. It should be noted that those skilled in the art can make improvements without departing from the inventive concept of the present disclosure, and these improvements are all within the scope of protection of the present disclosure.

What is claimed is:

1. A lens forming method, comprising:

heating a blank mold with a pre-molding cavity to a first preset temperature until a glass preform in the pre-molding cavity is in a semi-molten state;

applying a first preset pressure to the blank mold, so that the glass preform is extruded to form a lens rough blank with a predetermined shape;

cooling the blank mold and the lens rough blank, separating the blank mold by depressurization, to transfer the lens rough blank to a molding cavity of a high-precision aspherical mold;

heating the high-precision aspherical mold to a second preset temperature until the lens rough blank is softened to a semi-molten state;

applying a second preset pressure to the high-precision aspherical mold, so that the lens rough blank is extruded to form a lens molded part with an aspherical structure;

cooling the high-precision aspherical mold and the lens molded part; and separating the high-precision aspherical mold by depressurization, to remove the lens molded part;

wherein, the second preset temperature is greater than or equal to the first preset temperature, and the second preset pressure is greater than or equal to the first preset pressure;

the blank mold comprises: a first fixed mold with a first molding surface; and a first moving mold with a second molding surface; the first molding surface and the second molding surface are opposite and spaced apart, to form the pre-molding cavity; multiple first cavities are defined in the first molding surface; multiple second cavities are defined in the second molding surface; on a cross-section parallel to a mold closing direction, each of the multiple first cavities and each of the multiple second cavities has rectangular shape and spaces between the first cavities and the second cavities form pre-molding spaces of the lens rough blank;

the high-precision aspherical mold comprises: a second fixed mold with a third molding surface; and a second moving mold with a fourth molding surface; the third molding surface and the fourth molding surface are opposite and spaced apart, to form the molding cavity; multiple third cavities are defined in the third molding surface; multiple fourth cavities are defined in the fourth molding surface; and spaces between the third cavities and the fourth cavities form molding spaces of the lens molded part.

2. The lens forming method according to claim 1, wherein, the first preset pressure applied to the blank mold acts on the first moving mold; and when the first preset pressure is applied to the blank mold so that the glass preform is extruded to form the lens rough blank with the predetermined shape, a magnitude of a surface force is changed by controlling a distance between parting surfaces of the first moving mold and the first fixed mold, to control a shape of the lens rough blank.

3. The lens forming method according to claim 1, wherein, the second preset pressure applied to the high-precision aspherical mold acts on the second moving mold; and when the second preset pressure is applied to the high-precision aspherical mold so that the lens rough blank is extruded to form the lens molded part with an aspherical structure, a magnitude of a surface force is changed by controlling a distance between parting surfaces of the second moving mold and the second fixed mold, to control a shape of the lens molded part.

4. The lens forming method according to claim 1, wherein, the blank mold is subjected to the heating and cooling steps separately in a first molding chamber of a molding machine, and during the blank mold heating and cooling steps, the first molding chamber is filled with nitrogen gas; or/and, the high-precision aspherical mold is subjected to the heating and cooling steps separately in a second molding chamber of the molding machine, and during the high-precision aspherical mold heating and cooling steps, the second molding chamber is filled with nitrogen gas.

5. The lens forming method according to claim 1, further comprising, vacuuming the pre-molding cavity, before applying the first preset pressure to the blank mold;

or/and, vacuuming the molding cavity, before applying the second preset pressure to the high-precision aspherical mold.

6. The lens forming method according to claim 1, wherein, the first preset temperature is equal to a glass sag temperature plus T1, and $20°$ C.$\leq$T1$\leq$40° C.; or/and, the second preset temperature is equal to the glass sag temperature plus T2, and $20°$ C.$\leq$T2$\leq$50° C.; or/and, after cooling the blank mold and the lens rough blank, a temperature of the blank mold is a third preset temperature, wherein the third preset temperature is equal to a glass transition temperature minus T3, and $20°$ C.$\leq$T3$\leq$50° C.

7. The lens forming method according to claim 1, wherein the lens molded part comprises a plurality of lenses arranged in an array, and the plurality of lenses arranged in an array are cut by a laser to obtain individual lenses.

8. The lens forming method according to claim 1, wherein the glass preform is a molten glass droplet or a glass substrate.

* * * * *